United States Patent [19]

Lindmeyer

[11] Patent Number: 4,763,436
[45] Date of Patent: Aug. 16, 1988

[54] LURE DRESSING WITH HOOK GUARD

[76] Inventor: James P. Lindmeyer, 705 N. Main St., Hutchinson, Minn. 55350

[21] Appl. No.: 58,571

[22] Filed: Jun. 5, 1987

[51] Int. Cl.⁴ .............................................. A01K 83/00
[52] U.S. Cl. ..................................... 43/42.1; 43/42.4; 43/42.41; 43/42.06
[58] Field of Search .................. 43/42.06, 42.1, 42.24, 43/42.4, 42.41, 42.45, 42.49, 42.39

[56] References Cited

U.S. PATENT DOCUMENTS

| | | | |
|---|---|---|---|
| 2,136,713 | 11/1938 | Schnabel | 43/42.41 |
| 2,191,244 | 2/1940 | Wise | 43/42.1 |
| 2,332,400 | 10/1943 | Richardson | 43/42.1 |
| 2,589,435 | 3/1952 | Roeben | 43/42.1 |
| 2,913,849 | 11/1959 | Rolstone | 43/42.41 |
| 2,981,027 | 4/1961 | Dewyer | 43/42.1 |
| 3,066,434 | 12/1962 | Duller | 43/42.06 |
| 3,108,389 | 10/1963 | McGuire | 43/42.06 |
| 3,151,413 | 10/1964 | Witz | 43/42.1 |
| 3,163,958 | 1/1965 | Quinn | 43/42.06 |
| 3,722,128 | 3/1973 | Tremblay | 43/42.06 |
| 3,815,274 | 6/1974 | Schleif | 43/42.1 |
| 3,908,298 | 9/1975 | Strader | 43/42.41 |
| 4,217,721 | 8/1980 | Hershberger | 43/42.41 |

FOREIGN PATENT DOCUMENTS

| | | | |
|---|---|---|---|
| 511719 | 4/1955 | Canada | 43/42.1 |
| 696564 | 10/1964 | Canada | 43/42.1 |
| 2511860 | 10/1976 | Fed. Rep. of Germany | 43/42.1 |

Primary Examiner—Kurt Rowan
Attorney, Agent, or Firm—Douglas L. Tschida

[57] ABSTRACT

A soft plastic-bodied fish attractor threadably mountable over a fish hook and including a guard collar wherein the barb is embedded for weedless retrieval. In a jig compatible embodiment, the attractor comprises a tubular forward portion which mounts in non-rotative relation to a jig head and which radially flares outward to a disk-like guard collar portion and from a rear surface of which a plurality of filamentary members extend. In an artificial worm embodiment, the guard collar is integrally molded with the body rearward of the head.

8 Claims, 3 Drawing Sheets

LURE DRESSING WITH HOOK GUARD

BACKGROUND OF THE INVENTION

The present invention relates to artificial fishing lures and, in particular, to a molded, soft plastic-bodied attractor which threadably mounts in weedless relation about a fish hook.

In the recent past, a host of soft plastic-bodied lure dressings have been developed in a rainbow of colors and scents for enhancing the attractant qualities of a fishing lure. Such dressings are available in a variety of shapes, from crawfish, to worms, to grub-like members, but each of which generally includes a trailing tail member shaped to oscillate and/or vibrate in the water as the lure is retrieved.

The dressings are commonly mounted to the hook by threading the hook barb through a desired body part until the barb and hook eye are properly positioned relative to the coupled fishing line. Most commonly, the barb remains exposed relative to the body of the dressing, although in various riggings, such as "Texas" rigged worms, the barb of a specially bent fish hook is embedded into the body member to provide weedless operation. Upon the occurrence of a fish strike and the setting of the hook, the barb is forced through the body. Again, though, specially formed hooks are required to prevent undesired lure rotation, yet provide a vibrating tail action and an undulating appearance to the lure upon retrieval.

Whereas the foregoing methodology is compatible with artificial worm rigs, lead head jig fishing does not readily lend itself to weedless rigging. In fact, most commonly the hook-containing jig head is merely threaded onto a shortened worm-like body having an elongated vibrating tail and relative to which the barb is positioned in exposed relation. Weedless operation, however, is generally unattainable, without the aid of other add-on devices to shield the barb and throat area of the hook. Most commonly, these latter devices comprise one or more relatively stiff filamentary members which are mounted to rearwardly angulate from the head area to align with and shield the barb from passing weeds and other aquatic obstructions.

Otherwise, to the extent Applicant is aware of any other weedless devices, they generally comprise separable, aerodynamically designed attachments for single, double and trebel hooks, which the angler must separately store in his/her tackle box and attach as needed to the lure. Examples of two treble hook guards of which Applicant is aware can be found upon directing attention to U.S. Pat. Nos. 2,332,400 and 3,815,274. The '400 patent discloses a flared, hollow coned body member, the widest portion of which mounts adjacent the barb and squeezes inward with a fish strike, but which relies on other lure components to provide vibratory action. The '274 patent, in contrast, discloses a rigid, spring-loaded hook guard which allows the hook to slide forward with a fish strike, but otherwise adds no attractant qualities to the presentation.

While each of the foregoing soft plastic-bodied dressings and weedless hook attachments offer desirable advantages, nowhere does there presently exist a soft-bodied dressing that provides inherent weedless operation when a conventional hook is used. Still further and appreciating increasing recent attention to the importance of a lure's "speed of fall" and related movement, as it sinks to the initial depth from which the angler begins his/her retrieve, and the correspondence of these fall characteristics to triggering a fish strike, nowhere are existing lures designed to fall at a controlled rate, nor are they designed to impart any particular movement as they descend. The importance of these latter attributes is discussed in *Bassmaster* magazine, April, 1987, pp. 129-132.

SUMMARY OF THE INVENTION

Appreciating the desirable attributes of the foregoing components and the deficiencies of available soft-bodied lures to accommodate weedless operation and the importance of a lure's fall properties, Applicant has conceived of a new soft-bodied lure dressing which provides a vibratory action during retrieval and fall and which also provides for a controlled rate of fall due to increased flow resistance. Additionally, it maintains the barb in uppermost relation to the lure to facilitating hooking upon strike and for providing weedless operation and long life with repeated use.

Accordingly, it is a principal object of the present invention to provide a soft-bodied plastic lure dressing adaptable to existing technologies, yet enhance the lure's properties, both in its fall and retrieval characteristics.

It is a further object of the invention to include an integral reusable weedless guard member therein.

It is a further object of the invention to provide a dressing including at least one relatively large surface area member which radiates outwardly from the dressing body to support the hook barb in embedded relation thereto.

It is a further object of the invention to provide a dressing including a plurality of vibratory members.

It is a still further object of the invention to provide means for containing time-release scent in the body.

It is yet another object of the invention to provide means for inducing bubbling and/or other sonic properties.

The foregoing objects, advantages and distinctions of the subject invention are particularly achieved in a variety of embodiments adaptable to jig, artificial worm and live bait rigging techniques. In a jig compatible embodiment, the invention comprises a molded, soft plastic body member including an elongated forward portion which mounts about the hook shank and from which radiates an integral disk-like guard member wherein the barb of the hook may be embedded. A plurality of filamentary members, in turn, extend from the guard member to induce vibratory action upon retrieval. Tubular openings in the guard member provide additionally desirable sonic bubbling or may contain a time-release scent.

In another embodiment compatible with worm rigging, a disk-like guard member is incorporated into the body of an artificial worm for receiving an embedded hook barb.

In yet another embodiment compatible with the live bait rigging, the elongated forward portion of the jig dressing is replaced with a conically tapered portion which encompasses the hook guard and the rear surface of which mounts in concave relation to the hook barb. The filamentary members are also deleted, which allows the dressing to mount over relatively small hooks of sizes 6 to 10.

The foregoing objects, advantages and distinctions of the invention, among others, as well as its construction, will however be described in detail hereinafter with respect to the appended drawings. Before referring thereto, it is to be appreciated the following description is made by way of the presently preferred embodiment only and is not intended to be all-inclusive in its description. Rather, it is demonstrative only of the spirit and scope of the invention and should accordingly not be construed to the limitation of modifications and improvements thereto and of which various contemplated ones are described as appropriate.

BRIEF DESCRIPTION OF THE DRAWINGS

FIG. 6b shows an end view of the embodiment of FIG. 6a.

DESCRIPTION OF THE PREFERRED EMBODIMENT

Figure 1:
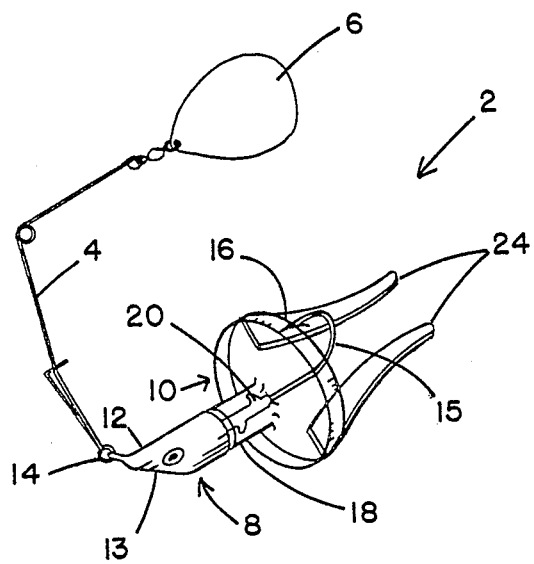
FIG. 1 shows a perspective view of the present soft-bodied plastic lure dressing in mounted relation to a weight-forward jig body and spinner blade containing wire form.

Turning attention to FIG. 1, a perspective view is shown of an improved spinner bait 2 which includes a wire form 4 to which is mounted a spinner blade 6 and a lead head jig 8 including a soft-bodied plastic lure dressing 10 of the subject invention. The dressing 10 is shown as if transparent to provide a greater appreciation of its mounting to hook 15 and the manner in which the filamentary members 24 extend therefrom. As will become more apparent hereinafter, the dressing 10 may be employed with a variety of lures and/or bare hooks, and may be adapted to a variety of rigging techniques with or without live bait.

With particular attention directed to the jig 8, it is comprised of a weighted head portion 12 of a generally tubular shape, although the lower surface 13 adjacent the hook eye 14 is tapered to provide a flat bottom-forward surface. During retrieval, this shape causes the hook 15, and particularly the barb 16, to stand upright and away from the lake bottom. This presents the barb 16 in the most advantageous position during pick-up, which increases the probabilities of hooking bottom-feeding fish. The rear portion of the head 12 includes a pair of integral barbs 20 which mount within the lure dressing 10, upon threading the dressing 10 onto the hook 15, to prevent its rotation.

Figure 2:
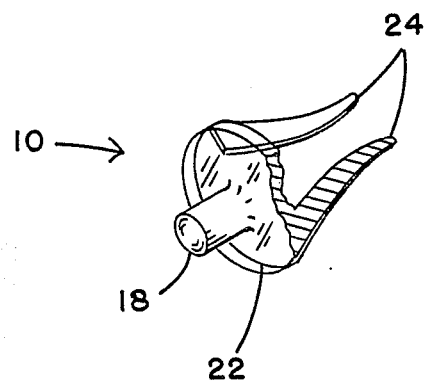
FIG. 2 shows a detailed perspective view in partial cutaway of the lure dressing of FIG. 1.
Figure 3:
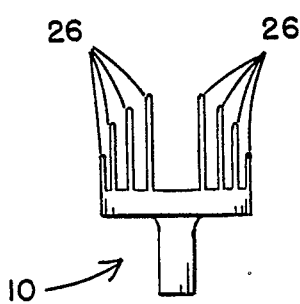
FIG. 3 shows a plan view of an alternative embodiment of the lure dressing of FIG. 1, including a number of staggered length filamentary members which radiate from its rear surface.

Turning attention to the lure dressing 10 and with additional attention to FIG. 2, it is molded from a soft, pliable plastic, which may be dye-colored, may contain metal flaking and/or be molded in a variety of shapes. Heretofore, such dressings have predominantly been formed in the shape of worms, or grub-like members, having large surfaced tails which flex and vibrate in an enticing manner during lure retrieval. The forward tubular portion 18 of the dressing is sized relative to the intended range of hooks usable with each dressing 10, but generally mounts about the shank of the hook or to the rear of the jig head 12.

Immediately therebehind is formed an integral disk-like guard collar 22, the forward surface of which may be formed in a variety of aerodynamic or relatively large surface area designs. Depending upon the design and size relative to the weight of the hook 15 and/or jig head 12, the fall rate of the lure 2 is controlled, much like a parachute, by displacing greater amounts of water as the lure falls. This induces a slower, more erratic fall than otherwise occurs with a more aerodynamic forward shape. In particular, for comparable weight lures 2, one constructed with a conventional round head jig and grub tail and the other constructed like that of FIG. 1, except without the wire form 4, the present lure has been found to fall at half the rate as the other.

Generally, though, the guard collar 22 is sized to a diameter greater than the throat of the hook 15 to permit the embedding of the barb 16 anywhere along its annular rear surface. With repeated use of the dressing 10, it is to be appreciated that the circular guard 22 permits the periodic rotation of the dressing about the head 12 to expose unpunctured portions of the guard and thereby prolong dressing life. This becomes especially important when fishing weedy structure and wherein plant life and other encountered obstructions may induce the premature exposure of the barb 16 as the lure 2 is fished. The density of the plastic may also be controlled, but it is still to be appreciated that with each hook set, the barb 16 completely punctures the collar 22. Generally, though, the hook guard is of a diameter greater than the throat of the hook 15 which not only protects the barb 16, but tends to displace encountered weeds and the like to one side or the other of the lure 2 as it is retrieved.

Projecting rearwardly from a radial axis of the guard collar 22 including the hook 15 are a pair of filamentary tails 24 which are shaped to vibrate as the lure is retrieved. Each member 24 is of a generally flat construction, including inwardly tapering trailing ends, which members as they pass through the water, tend to vibrate in an appealing fashion. Although a presently preferred construction is shown, it is to be appreciated a variety of tall shapes may be employed.

In the latter regard and appreciating the dressing 10 may be constructed in a variety of shapes having differently arranged forward and trailing surfaces, the following FIGS. 3 through 6 disclose a number of plan views of alternative filament configurations. FIG. 7, in turn, discloses a dressing useful for live bait rigs having a foreshortened conically tapered forward portion and a guard collar having a concave rear surface.

Addressing first, though, the alternative dressing constructions of FIGS. 3 to 6, FIG. 3 discloses an embodiment of the dressing 10 including a number of thread-like filamentary members 26 of successively reduced length relative to the concentrically mounted hook shank. Although each of the members 26 are positioned along a radial axis passing through the hook 15, it is to be appreciated they may be positioned anywhere about the rear guard surface and may be trimmed in any desired fashion and to any desired length.

Figure 4:
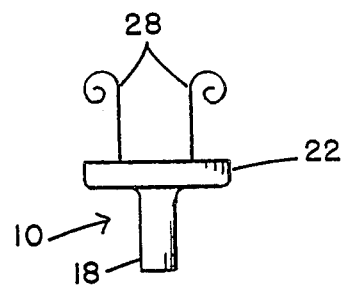
FIG. 4 shows a plan view of another alternative embodiment rotated to depict filamentary members having spiraling tail portions.

FIG. 4 discloses an embodiment including filamentary members 28 somewhat like those of FIGS. 1 and 2, although each are shown rotated 90 degrees to better depict the trailing ends which are spirally formed to wrap upon themselves. Greater vibration is thereby achieved during lure retrieval.

Figure 5:
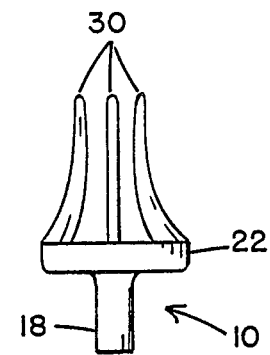
FIG. 5 shows yet another plan view of an alternative embodiment including filamentary members of the type of FIG. 1 positioned at each rear quadrant of the rear face.

FIG. 5 discloses an embodiment like that of FIGS. 1 and 2 but wherein the opposed pairs of filamentary members 30 are mounted along radial axes passing through the hook 15 orthogonal to one another. Again, though, any number of members 30 or other positions may be used.

Figure 6A:
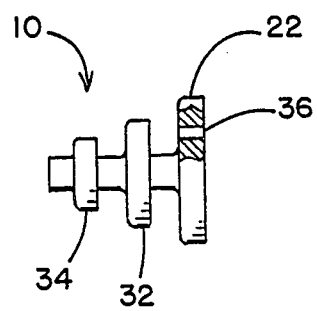
FIG. 6a shows a plan view in partial cutaway of still another alternative embodiment including a number of spaced-apart disk-like hook guards of successively increasing radii and wherein tubular apertures are formed in the rearmost disk.
Figure 6B:
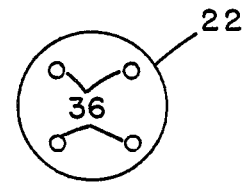
Figure 7:
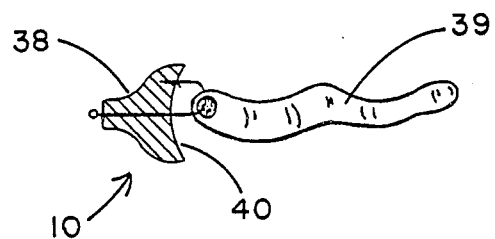
FIG. 7 shows a cross-sectional view of a live bait lure dressing for relatively small hooks.

FIGS. 6a and 6b, in turn, disclose a dressing 10 including a relatively elongated forward surface and about which radially extend a number of guard collars 22, 32 and 34, of successively decreasing diameters. Due to the greater amount of exposed forward surface area, such a dressing tends to fall more slowly than the dressings of FIGS. 1 and 2. As to the rearmost guard collar 22, a number of longitudinal holes 36 are formed through the guard collar, which are visible in the cut-away portion of FIG. 6a and the end view of FIG. 6b, which induce bubbling and other sonic vibrations as the lure 2 is retrieved. Although depicted only in the one embodiment of FIGS. 6a and b, it is to be appreciated such tubular, bubble-inducing passages 36 may be provided in any of the foregoing dressings.

In addition to tubular passages 36, small cavities might also be formed in the body to receive appropriate scents. Over time and with the access of water thereto via appropriate passageways, these scents may be released to the water during lure retrieval to further entice a fish strike.

Turning attention next to FIG. 7, a live bait dressing is disclosed in a cross-sectional view, wherefrom its convex forward surface 38 and concave rear guard surface 40 are apparent and which shape facilitates the mounting of the dressing over relatively small hooks 41 intended for use with live bait. For example, leeches 39 or minnows might be secured to the hook 41 and fished in a weedless fashion with the aid of the subject dressing 10.

Figure 8:
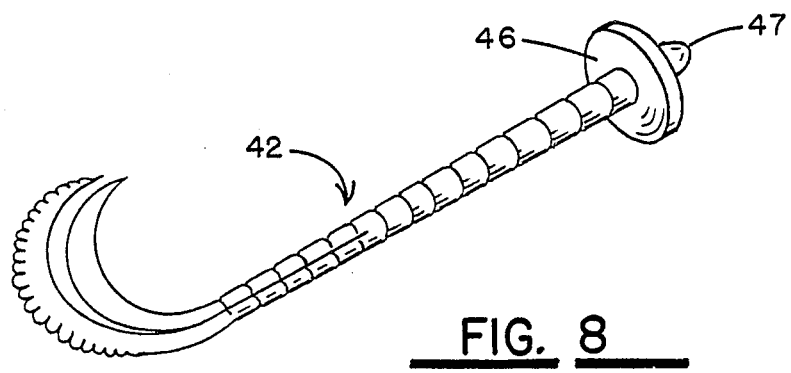
FIG. 8 shows a perspective view of a soft plastic artificial worm including the guard ring of the subject invention.
Figure 9:
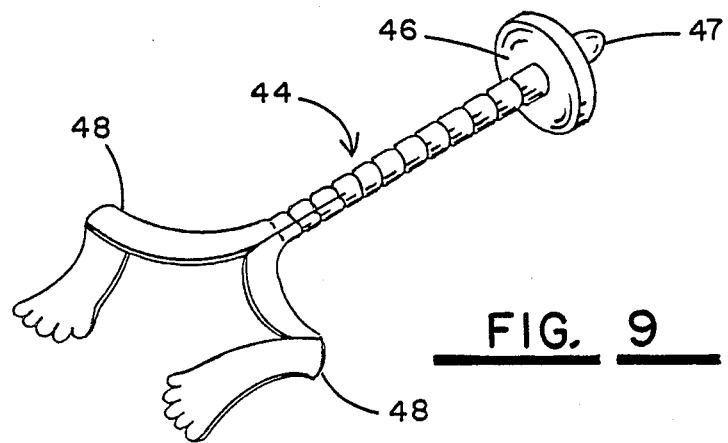
FIG. 9 shows a perspective view of yet another artificial worm having bifurcated, accordion-like rear tail portions.

FIGS. 8 and 9, in turn, disclose alternative embodiments of soft-bodied plastic worm-like structures 42 and 44, including guard collars 46 integrally formed therein immediately behind the head 47. In lieu of using specially formed hooks to achieve a "Texas" rig with such worms, a conventional hook might be used, yet still be rigged in a weedless fashion. Whereas the worm of FIG. 8 is of a generally conventional construction, although having a pair of co-planar split tail members, the embodiment of FIG. 9 discloses a lizard-like dressing having split tail portions 48, the flattened portions of which are folded in accordion fashion. During lure retrieval, such filament tends to extend/retract and vibrate with greater action.

While the subject invention has been described with respect to its presently preferred and various alternative embodiments, it is to be appreciated yet other embodiments are conceivable by those of skill in the art without departing from the spirit and scope of the following claimed invention. It is accordingly contemplated the following claims should be interpreted so as to include all those equivalent embodiments within the spirit and scope thereof.

What is claimed is:

1. A barbed fish hook dressing comprising a molded, disposable member formed from a resilient water-impermeable soft plastic of a density permitting its threaded mounting over a weight forward barbed fish hook, said member having a cylindrically elongated fore-end extending rearward to a solid cylindrical collar portion radiating outward beyond a hook barb which mounts in embedded relation in a trailing surface of said collar portion and wherefrom at least one integral vibratory, filamentary portion extends.

2. Apparatus as set forth in claim 1 wherein said filamentary portion comprises an elongated worm-like member including at least one flattened, tail section.

3. Apparatus as set forth in claim 1 wherein the trailing surface of said collar portion is concave.

4. Apparatus as set forth in claim 1 wherefrom a plurality of integral filamentary members extend from the trailing surface of said collar portion and each of said filamentary members is shaped to vibrate as said body member is retrieved through water.

5. Fishing lure apparatus comprising:
   (a) a single barbed fish hook having a weighted member secured to a hook shank rearward of a line attaching eye; and
   (b) a molded, disposable dressing member formed from a resilient water-impermeable soft plastic of a density permitting its threaded mounting over said hook barb in abutment to said weighted member, said dressing member having an elongated fore-end extending rearward to a solid collar portion radiating outward therefrom beyond the barb of said hook which barb is impaled in a trailing surface of said collar portion and from which trailing surface at least one integral vibratory, filamentary portions extend.

6. Apparatus as set forth in claim 5 wherein the lengths of each of said filamentary members are sized relative to their radial disposition to a longitudinal center axis.

7. Apparatus as set forth in claim 5 wherein said collar member includes a plurality of through passages.

8. A fish hook dressing comprising a molded, disposable member formed from a resilient water-impermeable soft plastic of a density permitting its threaded mounting over a single barbed hook, said dressing member having a cylindrical fore-end extending rearward to a first solid collar portion radiating outward therefrom beyond the barb of said hook which mounts in impaled relation in a trailing surface of said first collar portion and from which trailing surface a plurality of collared segments successively extend, each collared segment including an elongated portion extending from the trailing surface of a forward collar portion and a trailing solid collar portion exhibiting a successively increasing diameter.

* * * * *